United States Patent [19]

Carter, II

[11] Patent Number: 4,463,432
[45] Date of Patent: Jul. 31, 1984

[54] POWER CONTROLLER USING DUAL DEADBANDS FOR REDUCING OSCILLATORY LOAD MANIPULATIONS

[75] Inventor: Woodward C. Carter, II, Maitland, Fla.

[73] Assignee: Westinghouse Electric Corp., Pittsburgh, Pa.

[21] Appl. No.: 296,277

[22] Filed: Aug. 26, 1981

[51] Int. Cl.³ .............................................. G06F 1/00
[52] U.S. Cl. .................................. 364/483; 364/493; 364/153; 307/35; 307/39
[58] Field of Search ............... 364/483, 492, 493, 153, 364/156, 178, 495; 307/35, 39

[56] References Cited

U.S. PATENT DOCUMENTS

| | | | |
|---|---|---|---|
| 3,517,310 | 6/1970 | Gates . | |
| 3,602,703 | 8/1971 | Polenz | 364/492 |
| 3,652,838 | 3/1972 | Dillon | 364/493 |
| 3,872,286 | 3/1975 | Putman | 235/151.21 |
| 4,075,699 | 2/1978 | Schneider | 364/492 |
| 4,125,782 | 11/1978 | Pollnow, Jr. | 307/35 |
| 4,181,950 | 1/1980 | Carter | 364/492 |
| 4,253,151 | 2/1981 | Bouve | 364/492 |
| 4,283,635 | 8/1981 | Balmer | 307/35 |
| 4,321,477 | 3/1982 | Bartlett | 307/35 |
| 4,363,101 | 12/1982 | Czerniejewski | 364/492 |

OTHER PUBLICATIONS

K. Chen et al., An Update on Rate Reform and Power Demand Control Load Data Working Group, IEEE Transactions on Industry Applications, vol. 1A-15, No. 2, (Mar./Apr., 1979).

Primary Examiner—James D. Thomas
Assistant Examiner—Archie E. Williams, Jr.
Attorney, Agent, or Firm—C. M. Lorin

[57] ABSTRACT

A sliding window power demand control system switches loads, of sufficient size and function to cause a significant effect on plant energy consumption, ON and OFF. Loads to be switched are selected by a priority schedule in accordance with a determination made at each sampling instant and based on the projected power at the "next" sampling instant. Projected demand and the intended change in the demand are compared to a deadband in the demand about an assigned demand limit and to a deadband in the power consumed about the assigned demand limit. Load manipulations are thereby minimized.

8 Claims, 12 Drawing Figures

POWER CONTROLLER USING DUAL DEADBANDS FOR REDUCING OSCILLATORY LOAD MANIPULATIONS

BACKGROUND OF THE INVENTION

The invention relates to power demand control in general, and more particularly to a power demand control system and method for shedding and/or restoring loads in a plant so as to maximize the consumption of energy within a limit imposed in the power demand consumed by the plant under the billing rates of the utility company when they are computed in accordance with a "floating" or "sliding" window, namely, a continuous power integration through a sliding demand period, rather than by the conventional accumulation of energy through successive constant demand periods. The invention more specifically relates to plant installation where there are only a few controllable loads and where such few loads are relatively large loads that cannot be shed and restored very frequently.

Plant management requires constantly that decisions be made to curtail or increase loads selectively so as to maximize profits, to optimize performance, and/or trim power peaks according to the time of the day and the overall plant activity under a given demand limit established with the electric utilities.

Automatic load control in a plant depends upon how the utility companies are charging the customer per kilowatt-hour consumed and per accumulated kilowatt-hour within the demand period (the kilowatt-hour/hour average rate measured during the time period). There are five basic control modes depending on the rate applied to the customer:

(1) An instantaneous demand controller—This controller is based on straight line accumulation, e.g., constant usage. The rate of accumulation is imposed as a setpoint for load switching in the overall plant.

(2) An ideal rate controller—This mode of control accepts an offset point or base consumption by non-discretionary loads, thereby reducing cycling operation.

(3) A converging rate controller—Here the accumulated usage is set to converge toward an assigned demand limit, thereby to relieve control in the beginning of the period and tighten control toward the end of the period.

(4) The predictive demand controller which is typified by U.S. Pat. No. 3,872,286 of Richard Putman. Here, the energy usage and usage rate are observed periodically through a fixed demand period. By projection to the end of the demand period of predicted usage is calculated. This is compared in the usage corresponding to the demand limit, establishing an error which determines whether to shed or restore loads.

(5) A continuous integral controller—The determination of demand is effected by averaging the power utilized within a time interval ("window"), the start and ending points of which are made to continuously move ("slide") in time, rather than through fixed consecutive adjacent time intervals. Thus, each consecutive demand period is slightly shifted from the preceding one and from the following one. If the demand window is say fifteen minutes, the successive demand periods may be considered to start every four seconds, thus allowing 250 demand periods to start (and another 250 to end) within a 15 minute time span. In this regard, see "An Update on Rate Reform and Power Demand Control Load Data Working Group" by K. Chen and E. Palko in 1979 IEEE Vol. IA-15 No. 2 March/April 1979 pp. 214-220.

The present invention relates to a continuous integral controller system. In order to reduce the frequency of switching loads ON and OFF, prior art may use satellite cycle timers on the loads or groups of loads. Once activated, the satellite timer will shed loads through a complete cycle and overlap successive demand intervals, thereby reducing short cycle operation.

Certain loads, however, especially large production loads, such as electric arc furnaces, cannot be manipulated too often.

The prior art method of sliding window demand control, while suitable for many small non-production loads, could then be quite detrimental to plant operation, and this method computing the demand by the utility company will unduly penalize the user.

SUMMARY OF THE INVENTION

In a sliding window controller system, as a compromise between close control of any excursion above, or below, the assigned normal demand DL and a desirable reduction of the frequency of load manipulations under such control, a demand limit deadband LB is established above and below the demand limit DL and a deadband PB is established for the instantaneous power above and below the demand limit DL.

The size of the demand limit deadband LB is a compromise between the accuracy of control (closeness of the maximum demand excursion from the demand limit DL to the value of DL) and the frequency with which loads are manipulated (turned OFF, e.g., shed, or ON, e.g., restored). The power deadband PB is distinct from the demand deadband LB. The intent of PB is to permit the system to recognize the need for an "early" correction to avoid over-correction by looking at instantaneous power as well as averaged power. In this sense, it is somewhat like a stabilizing rate feedback applied to the highly nonlinear, large load increment in the sliding window demand controller. In general, PB defines a "noise" power band outside of which a significant change in demand is deemed to be in progress. This information can be used to initiate early control action to avoid overcontrol and, in a sliding window system, to prevent resultant oscillatory behavior.

The disclosed sliding window control system operates as a sampled data control system exercized every $\Delta W$ time increment. $\Delta W$ should be small compared to the window width W. The system operation provides for updating, at any sampling time $t_i$, the actual demand $D_i$ statistics from time t-W to time $t_i$ and based on constant power usage from time $t_i$ to $t_{i+\Delta W}$, also providing for estimating the demand $D_{i+1}$ at the next sample (from time $t_{i+\Delta W} - W$ to time $t_{i+\Delta W}$). Based on this projection:

I. Load shedding at time $t_i$ occurs if:
  (a) projected demand $D_{i+1}$ at $t_{i+\Delta W}$ exceeds DL+LB. or
  (b) projected demand $D_{i+1}$ is increasing from $t_i$ to $t_{i+\Delta W}$, and projected demand $D_{i+1}$ is above DL, and power $P_i$ at $t_i$ is above power DL+PB.

II. Load restoration at time T occurs if:
  (a) projected demand $D_{i+1}$ at $t_{i+\Delta W}$ is less than DL−LB or
  (b) projected demand $D_{i+1}$ is decreasing from $t_i$ to $t_{i+\Delta W}$, and projected demand $D_{i+1}$ is below DL, and power $P_i$ at $t_i$ is below power DL−PB.

LB and PB in the above may have separate values above and below DL, depending on the utility rate tariff, DL may be a nominal limit or DL+LB may be set at a utility defined absolute maximum.

BRIEF DESCRIPTION OF THE DRAWINGS

FIG. 5A is the power curve, FIG. 5B is the demand curve;

Figure 1:
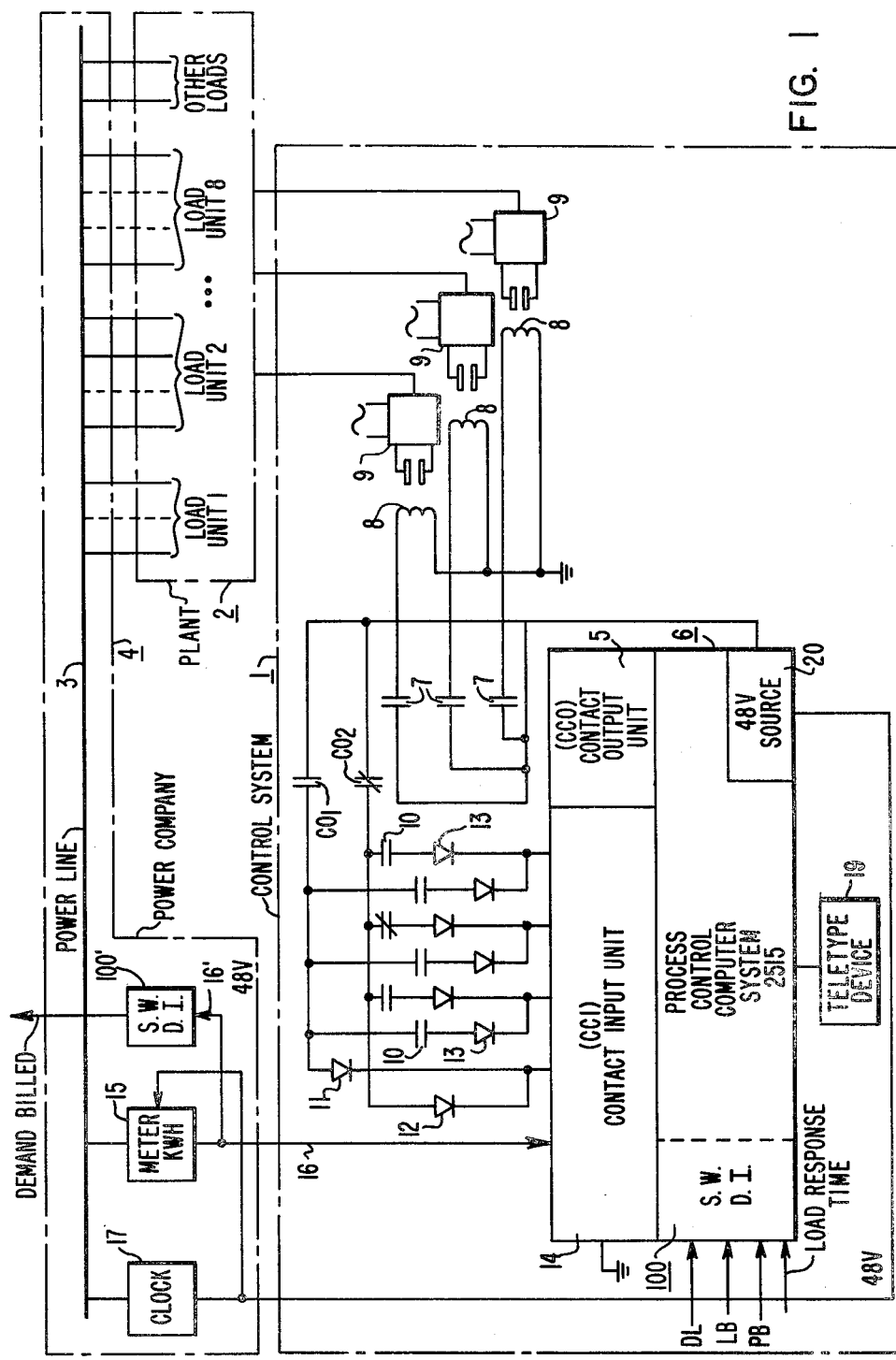
FIG. 1 shows the overall sliding window control system according to the present invention.

GENERAL DESCRIPTION OF THE INVENTION IN THE CONTEXT OF THE STRUCTURAL AND OPERATIVE CHARACTERISTICS OF THE POWER DEMAND CONTROL SYSTEM OF U.S. PAT. NO. 4,181,950

For the sake of clarity and for the purpose of illustration only, the present invention will be described in the context of the power demand control system of U.S. Pat. No. 4,181,950 of W. C. Carter, which is hereby incorporated by reference.

In the context of the power demand control system of U.S. Pat. No. 4,181,950, adaptive priority determination is effected according to a priority schedule modified as a function of the actual production pattern of one or more production units in the plant.

In particular, selection for switching between several production units is made in accordance with the level of progression toward completion of the productive process in each unit. More specifically, with a plurality of similar production units operable in parallel within a common power supply, the invention is applicable to switching ON on a "last OFF, first ON basis" and for switching OFF on a "last ON, first OFF basis", often referred to as a "LOFO" priority scheme. In addition, means is provided for an operator to cause any "OFF" load to be considered "last OFF", or any "ON" load to be considered the longest ON, so as to, in effect, give that load the least likelihood of being shed, or the most likelihood of being restored.

This approach is particularly applicable to arc furnaces. Regulatory action is provided by controlling simultaneous operation of several arc furnaces, the number of arc furnaces effectively in service at a given time being (1) a function of an assigned power demand limit DL and (2) a function of the accumulation of power consumed obtained by integration during a window W which is constantly sliding by an amount $\Delta W$ defining successive demand periods $W_i$ of control, at sampling instants $t_i$. The integrated value from $t_{i-W}$ to $t_i$ being used by the utility company to maximize the charge, control is required to maximize the utilization of the overall arc-furnace capacity within a given industrial plant without unduly exceeding the charge.

The control system is used with units of production selected according to a priority scheme varying in relation to the production process. It can be used within the context of power demand control effected upon other types of controllable loads selected under fixed priority. This includes loads having a status of constraints making them available for control when the attached constraints have been lifted as a result of fulfillment of assigned operative requirements by expiration of prescribed times ON or OFF, or by an externally lifted prohibition, or which have in any form regained their degree of freedom.

The technique of computerized power demand limit of the prior art which is applied to advantage to control of arc furnaces in a plant supplied with power from a utility company has been adapted, according to the present invention, so that control can be performed under the constraints of a sliding window demand limit imposed by the utility company. Depending on the level of the demand, and the values of various furnace constraints and control parameters, like in the aforementioned U.S. patent of Carter, the computer may open, or close, permissive contacts of the furnace to force the demand toward the demand limit. The time at which a load is actually added, or shed, is determined and controlled in consideration of the incremental demand impact that particular load will have on the demand level. It is considered that each load has a predetermined response time which may be taken into account in determining when to shed or add a load.

Also, like in the aforementioned U.S. patent of Carter, the computer control system calculates when to shed or add loads, the calculations being based on the actual current value of the load itself which is stored in memory by the system. At each kilowatt-hour pulse, the value in memory for that load is updated as a function of the actual load being drawn. At the start of a heat, a nominal rating, as defined by the user, is inserted into a table of load values.

Furnaces are shed on a "last-ON first-OFF" basis.

Furnaces are restored in a "last-OFF first-ON" basis.

If the controller is in a demand control mode (AUTO) it will prevent any new furnace from being brought on-line until all loads previously shed have been restarted. However, the controller will keep track of, and automatically start, the new furnace after all those previously shed have been restored, provided that starting of the new furnace will not bring the demand over the demand limit.

As a result, the power demand limit control method according to the present invention is integrated with control of the arc furnaces as part of an adaptive control process thereof.

It will be hereinafter assumed that power demand can be controlled by a plurality of loads which at least in part can only be switched ON, or OFF. However, by ON and OFF, it is understood that in a general sense the loads need not be switched by electrical connecting, or disconnecting. Power consumption can be increased or decreased by mechanically connecting, or disconnecting a load, as well, for instance by means of a clutch, by valve actuation, or otherwise by transformer tap control, or input waveform control.

When several loads are available for being switched ON or OFF, there is a possibility at times that a load to be switched OFF by the controller is already OFF. Also, the particular load to be switched ON by the controller may have been previously put out of service. It is also possible that demand control is prevented by some overriding and external control equipment associated with the load, as is usual with air conditioners, chillers, or air compressors, for instance. These and other types of constraints can be found in a particular industrial plant of a customer of the utility company.

The selection of a load not only depends upon the overall status of the different loads, but also upon the behavior of any particular load in the user's plant. Therefore, the control system provides for the dynamic allocation of priorities when selecting loads to be controlled at any particular time.

The method also provides for relative control, rather than an absolute control of the loads, any selected and controlled load change being effected independently from the base load and from non-controlled loads.

The control method may also take into account the established constraints. For instance, besides interruptible loads which can be selected to be shed, or to be added, there may be loads in the plant having a non-controllable status which, otherwise, could defect the control system. However, the control system may also limit its own capability of switching loads in order to accept the non-controllable loads as a favorable factor of correction once in the demand limit control mode.

Moreover, the computer system, in the demand limit control mode, may call for the determination of the constraints either off-line, or on-line, in order to be able to ascertain with improved accuracy the anticipated effect of control, thereby preparing for the right decision when selecting the loads to be controlled at a given instant, or for an emergency action in the present control operation.

Referring to FIG. 1, there is shown an overview of a control system which may be used to implement the method according to the invention. The invention is applied to control of the loads of a plant 2 supplied with electrical power on the power supply lines 3 of a power supply. The loads are controlled by a contact output unit 5, which is part of the process control computer system 6. The contact output unit 5 does operate a plurality of load contact outputs 7, each of which closes the energizing circuit of a corresponding relay 8 to actuate the switching element 9 of a load. Such switching element may be the starter of an electrical motor, the plunger of the valve of a compressor, etc.

When a load is in the switched ON condition, a corresponding status contact interrupt 10 may be closed as shown on FIG. 1, with the contacts being arranged so as to correspond to the loads. There is shown in FIG. 1 illustratively a "multiplex" scheme with two such groups of contacts with one group being associated with a diode 11 and one scan contact output CO1, and the other group being associated with a diode 12 and another scan contact output CO2. Respective diodes 13 are connected in circuit with corresponding status contact interrupts 10 to establish a circuit from a 48 V source 20 provided by the computer system, to ground with the associated diode, 11 or 12. As shown on FIG. 1, concurrent closing of one scan contact output such as CO2 and one particular status contact interrupt 10, such as shown on the Figure, permits identification by the interrupt unit 14 of the status of the particular contact as being one of Group 2 (CO2 on the Figure).

In order to control the power demand by shedding or adding loads, the control system 1 is responsive to the power consumption continuously recorded by the meter 15 of the power supply company. The process control computer receives over a line 16 the KWH pulse which as a $\Delta t$ (time between successive pulses) characterizes the consumption at any particular instant.

In contrast to the control system of the aforementioned Putman patent and to the control system of the aforementioned Carter patent, the control system according to the present invention operates in relation to a continuously sliding demand period W. Accordingly, it is assumed that the utility company uses an equipment SWDI (for sliding window demand indicator) referred to as 100' in FIG. 1, for continuously integrating the instantaneous power $P_t$ derived on line 16' from wattmeter 15, over an entire demand period W (for instance of 15 minutes) ending at the very instant t at which $P_t$ is being sampled. Thus, equipment 100' calculates $$\frac{1}{W} \int_{t-W}^{t} P_t dt$$

continuously, and the customer is billed for the maximum area detected over the time interval $t-(t-W)$ at successive instants $t, t+dW, t+2dW$, etc ... according to the output thereof. The SWDI equipment 100' may be in accordance with the technique described in U.S. Pat. Nos. 3,189,821 of A. J. Petzinger; 3,517,310 of P. H. Gates et al.; 4,125,895 of G. P. Buhlmann or 4,229,795 of G. P. Buhlmann; or 4,229,795 of G. P. Viegarg et al., for instance.

In accordance with the present invention, a power demand control system is proposed in which the actual power demand consumed, continuously determined by the sliding window method, controlled so as to be is compatible with production requirements, thereby to minimize disturbances due to demand control and maximize production while following closely an assigned demand limit. In the instant case it is assumed that each such demand period (or demand window W) lasts 15 minutes. For each operation of the pulser mechanism of the meter 15 there is a pulse generated which will be hereinafter called "KWH pulse". The succession of these pulses represents on a time scale the energy consumed $D_t$ by loads connected to the meter, and the time between pulses indicated the rate of energy consumption, or power $P_t$.

Included as part of the control system 1, is the process control computer system 6. This computer system typically is a W-2515 under its trade name. It can be a digital computer system, such as a Prodac 2000 (P2000) sold by Westinghouse Electric Corporation. A descriptive book entitled "Prodac 2000 Computers Systems Reference Manual" has been published in 1970 by Westinghouse Electric Corporation and made available for the purpose of describing in greater detail this computer system and its operation. The input systems, associated with the computer processor are well known and include a conventional contact closure input system to effectuate scanning of the contacts or other signals representing the status of the equipment. Also, operator controlled equipment and various information input devices and systems are provided exemplified by the teletypewriter 19 shown in FIG. 1. The contact closure output system is also conventional and part of the Prodac 2000 general purpose digital computer system sold.

The process control computer system 6, through the interrupts (internally generated via scanned CCI's or external EI's) unit 14, assesses the status of the status contact interrupts 10, and more generally, monitors all the input data fed into the computer system regarding the individual loads in the plant with their constraints, effectuates calculations, makes decisions which are converted, either periodically or after each of the above-mentioned KWH pulses, into whatever load control action is necessary through the controlled operation of the relays 8.

The computer method used in the control system according to the invention includes both hardware and software. For instance, the interrupt unit 14 is associated with an interrupt handler. Software is being used as a convenient means of quickly and efficiently performing operations as required in monitoring data, doing calculations, making decisions and translating treatment of information into control action within the short time intervals determined by the recurrent transmission of KWH pulses from the power supply company meter 15.

It is observed that the inputs consist of interrupts (internally generated via frequently scanned CCI's or external EI's) which are successively handled by the process interrupt handler. One interrupt will receive a train of pulses transmitted by the meter 15, each pulse representing a fixed amount of KWH (or RKVAH) consumed. Additional interrupts could be reserved for other KWH meters if needed. Three other interrupts (the scan contact interrupts 10 of FIG. 1) could be used to receive a status which corresponds to the status of one load contact in the plant and belongs to one group of three associated with one scan contact output (CO1, CO2 in FIG. 1). The units of production under control may be provided with individual meters beside the main company meter.

The normal operator interface with the system will be via a teletypewriter or video terminal (CRT/keyboard) 19. This device will also provide a log of system performance together with any other messages that may be required. Via the typewriter keyboard the operator will also be able to change the values of various constants relating to the system as a whole or to individual items of equipment. The time and data and on-peak and off-peak demand levels can also be changed using the same keyboard.

While a sliding window demand indicator (SWDI) 100' can continuously or at short intervals provide the utility company with the integrated value of the instantaneous power consumed $P_t$ over the continuously sliding demand period W, the process control computer system 6 includes, according to the present invention, its own sliding window demand indicator (SWDI) 100. In contrast to the possible continuous integration of $$\frac{1}{W}\int_{t-W}^{t} P_t dt$$

by SWDI 100', indicator 100 in the computer system 6 operates on the basis of selected elementary time intervals $\Delta W$ which divide the demand period into many elementary time intervals, such elementary time intervals being chosen of such width $\Delta W$ as to be compatible with the size of W and the precision with which the demand can practically be controlled. The computer system 6 is operating on the basis of the KWH meter pulses which indicate energy consumption. Although on FIG. 1 a single meter 15 is shown within the utility company area 4, it is understood that KWH meters are installed in the plant and KWH pulses may come to the computer from several meters like at 16 for a single meter. Each such KWH-pulse from a specific source represents a fixed amount of KWH, of RKVAH or of KQH, and the time $\Delta t$ between pulses is indicative of the time it took to consume that fixed amount of KWH, RKVAH or KQH. Since a fixed demand period is not used, there is no need to reset the KWH meter for totalizing the accumulated energy through the period. The computer, instead, does the calculation throughout every demand period sampled at instants $t_i$, $t_{i+1} = t_i + \Delta W$, $t_{i+2} = t_i + 2\Delta W$, etc ... , e.g. upon each increment of time $\Delta W$. Accordingly, the computer system no longer recognizes a reset of the demand period timer and the corresponding pulse. A pulse is now defined as a contact closure input and subsequent opening of this same contact is not recognized by the computer system. Therefore, the input from the wattmeter, in each instance, is either a two-wire input, or, if it has a three-wire input, the third wire of the input is not recognized. Alternatively two inputs could be used and a three-wire input utilized. The computer system uses such plant KWH pulses to determine the total plant energy consumption. Based on such energy consumption monitoring determinations are made either to reduce load power levels or shed (turn OFF) loads, or to increase load power levels or restore (turn ON) loads in order to maintain the consumption close to the assigned demand limit DL.

Figure 2:
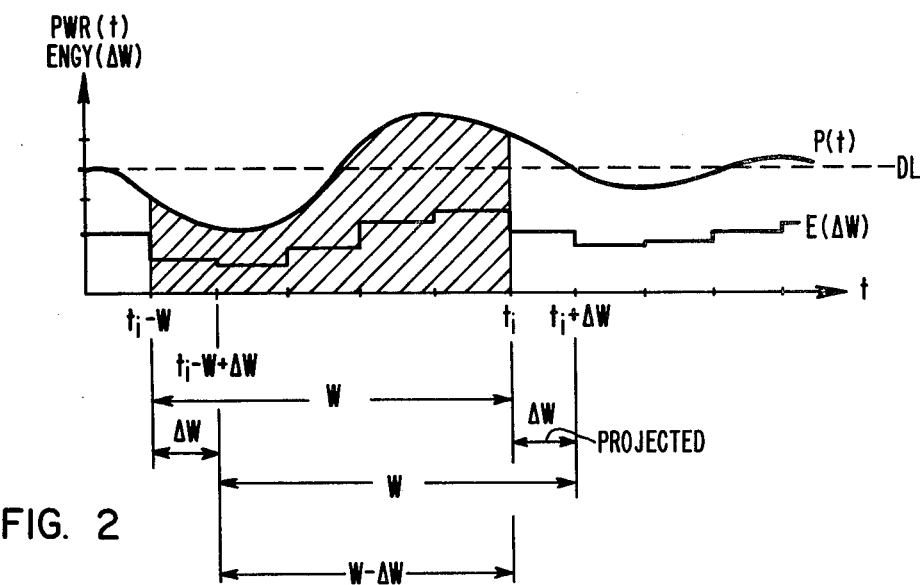
FIG. 2 illustrates a power profile curve related to various time intervals of constant power.

Referring to FIG. 2, a curve ($P_t$) illustrates the variations in time of the power $P_t$ sampled by the KWH meter, considered here for the sake of simplicity as representative of the total power consumed in the plant. The SWDI 100 of the computer system 6 samples $P_t$ only every $\Delta W$ time intervals. Each sampling time $t_i$ is related back to the beginning of a demand period W just ending, and the amount of energy consumed through every such sliding demand period is constantly established. This is shown on FIG. 2 by the shaded area under the $P_{(t)}$ curve from time $t_{i-W}$ to time $t_i$. Thus, upon every successive time interval $\Delta W$ there is a sampling instant $t_i$. FIG. 2 also shows a second curve $E(\Delta W)$ which represents the energy consumed as affected in the successive $\Delta W$ periods by the plant. The object is to maintain the demand (the average height of shaded area) as close as possible to the demand limit DL, the latter assigned to the system by the consumer, for all shaded areas ending at successive instants $t_i$ upon every $\Delta W$ time increment. Thus, with the sliding window approach, instead of accumulating energy up to a total which should be close to the DLxW energy at the end of the demand period, the system operates in fact already at the end of a demand period W, just terminated, upon each sampling instant $t_i$. The demand is defined continuously as a function of time rather than only once at the end of the demand period. Accordingly, an error is continuously identified relative to the limit DL and at every sampling instant there may be a basis for correction by load adjustment, or by load shedding, or restoring control. However, loads cannot be continuously manipulated, especially large loads which operate under production constraints. It is the object of the present invention to make load manipulation compatible with demand limitations under a sliding window demand limit requirement and to minimize load factor sacrifice while reducing the load manipulation frequency.

The basic idea of the sliding window demand method, therefore, is to take a power-time profile such as shown in FIG. 2 and, for each and every time instant such as shown there for $t_i$, examine the average power for a time interval initiated at instant $(t_{i-W})$ through a window width up to instant $t_i$ (the crosshatched area in FIG. 2 divided by the window width W). This being the demand at time instant $t_i$, the billing demand is determined from the largest (or largest 2 or 3) of all such demand determinations. These calculations are often done off line after the fact from a magnetic tape or other record of power vs. time for the billing period.

From the user's standpoint, the sliding window is much more restrictive than the fixed demand period window defined by a reset pulse, because it precludes "catching up" on a period of lower power usage by a period of high power usage. This is due to the fact that, as the window "slides" to the point where the high power catch-up usage is in the older part of the window, a second period of low power usage would be mandated in order to avoid an excessive demand for that particular window.

The most obvious method of sliding window demand control would be to continually calculate the demand for the window just ending with a decision to shed loads if the calculation was over the limit, to restore loads if the calculation was under the limit. Unfortunately, especially with a few large loads like Arc Furnaces, this results in far too frequent load manipulations, although the load factor (here defined as the average power divided by the maximum demand), would be quite good (near 100%). With this method, shed and restore control decisions would probably alternate and take place after each control calculation.

Figure 3A:
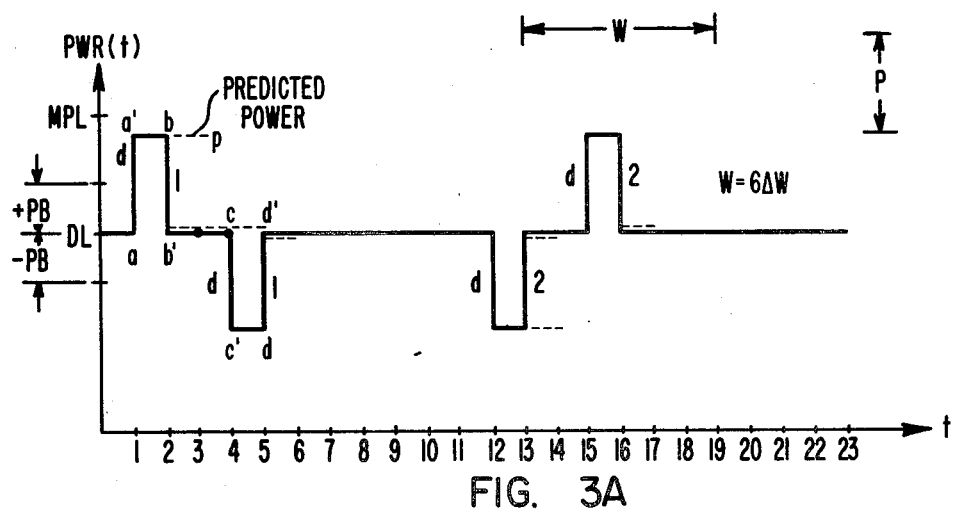
FIGS. 3A and 3B show the power curve and demand curve which illustrate the sliding window mode of control.
Figure 3B:
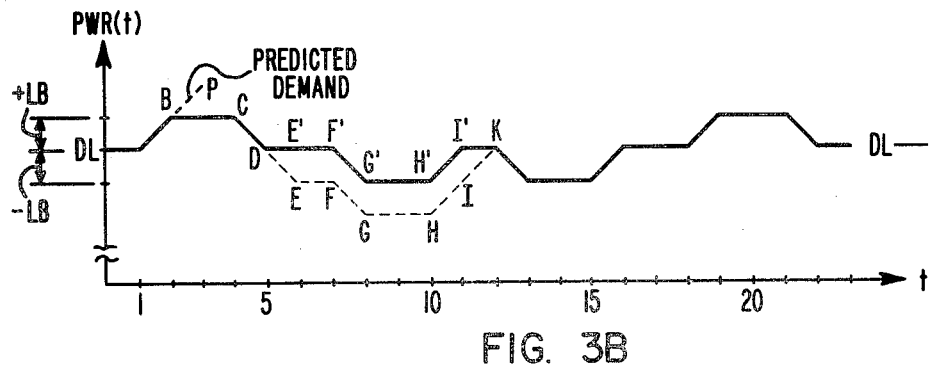
Figure 4A:
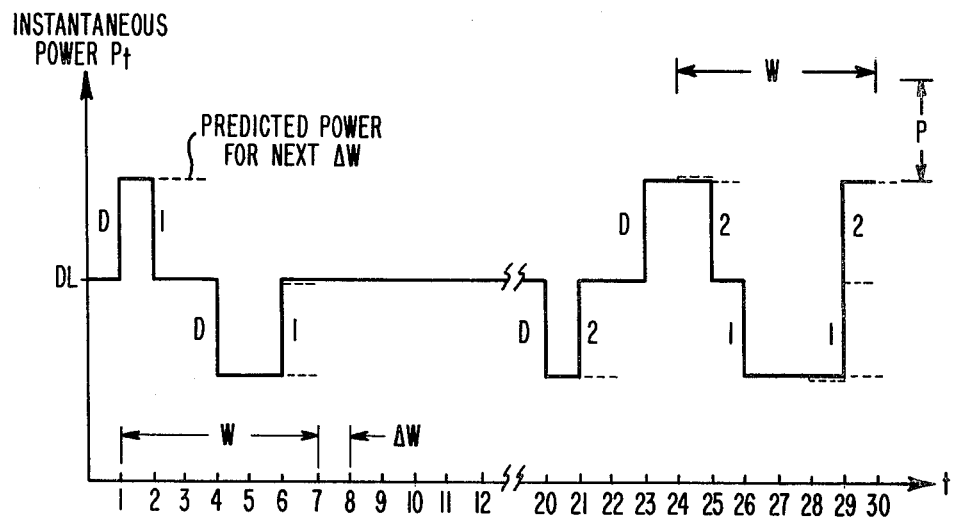
FIGS. 4A and 4B show the power curve and demand curve illustrating deadband control in the sliding window control system according to the present invention.
Figure 4B:
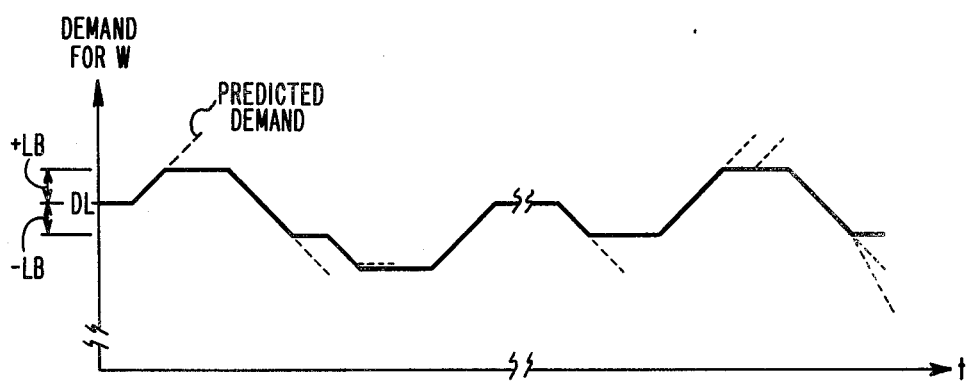

Referring to FIGS. 3A and 3B, FIG. 3A represents the power levels from the sampling instant $(t_i)$ to sampling instant $(t_{i+1})$, the power therebetween being looked upon constant, or as averaged for the duration of the time interval $\Delta W$ defined between two such consecutive sampling instants. Four excursions from an assigned demand limit DL are illustrated for which upon a subsequent sampling instant a correction is effected by the system of the amount necessary to bring back the deviation d to zero. FIG. 3B represents the demand, namely the energy accumulated during N slices of time $(t_i, t_{i+1})$ throughout the window W (where $W = N\Delta W$) just ended at the present time instant $t_i$. A deadband LB is established above and below the nominal limit DL. Correlatively to the demand curve of FIG. 3B, the power curve of FIG. 3A shows that the area corresponding to the excursion due to the first deviation lasting from instant $t_{i+1}=1$ to instant $t_{i+1}=2$ causes the demand to rise linearly (since the power is constant) up to the point where the deadband LB is exercised. It is assumed that before instant $t_{i+1}$ the demand curve (FIG. 4B) has been constantly equal to DL. Correction at instant $t_{i+1}=2$ causes the demand to remain on a plateau as shown. At time $t_i=4$ another deviation causes again the demand to vary linearly, downward this time, until again a correction at time $t_i=5$ brings back the demand on a plateau. In other words, the control system will shed whenever the demand is about DL+LB and will restore whenever it is below DL−LB. If the things work out symmetrically, the maximum demand will be DL+LB and the minimum demand DL−LB with an average power at the level DL. In practice, however, things do not work out that way. Referring to FIGS. 4A and 4B, it is shown how the power and demand curves as a function of time are, again, affected by occurring deviations of power d. It is observed here that at time $t_i=5$ on FIG. 4B (as opposed to what was assumed to happen on FIG. 3B at the same instant) no correction is made to restore power, on FIG. 4A, at the level DL, because the operative point of the demand is already there on FIG. 4B. Therefore, up to time $t_i=6$, power remains at the deviation level of FIG. 4A, while the operative point on the demand curve of FIG. 4B continues to follow a straight line downward. At time $t_i=6$, though, since the level −LB is reached, correction occurs which brings back power at the level DL of FIG. 4A. Accordingly, from $t_i=6$ to $t_i=7$, the demand remains on a plateau. Assuming there is no deviation on curve 4A from $t_i=6$ to $t_i=12$, it is observed, however, that at time $t_i=7$ the demand curve of FIG. 4B indicates a loss of a power amount marked on FIG. 4A between time $t_i=1$ and $t_i=2$. This is due to the window W, which in the example is six time intervals $\Delta W$ long, sliding away from $t_i=1$ to $t_i=2$. This is shown by a decreasing ramp on FIG. 4B and the demand curve clearly exceeds the level −LB without any corrective control taking place. Two time intervals later, namely from $t_i=10$ to $t_i=12$, the demand curve of FIG. 4B exhibits a ramp upward. This ramp is due to the fact that the tail of the window is at the same time passing from $t_i=4$ to $t_i=6$, thereby no longer experiencing the loss of power due to the deviation at time $t_i=4$ on the curve of FIG. 4A.

In conclusion, there is an overcorrection at times $t_i=5$ and $t_i=6$ leading to an excursion beyond the deadband −LB. Similar observations can be made with respect to the corrected deviations occurring at times $t_i=20$ and $t_i=23$.

Correction at time $t_i=21$ is translated into a leveled demand, at −LB, which lasts until $t_i=23$ when a second deviation in the opposite direction occurs. Assuming that before time $t_i=20$ the operative point on the demand curve (FIG. 4B) has remained at the level DL, the effects of the areas for which power is above or below DL (FIG. 4A) start to be felt once the tail of the window W passes through the $\Delta W$ interval from $t_i=20$ to $t_i=21$, the $\Delta W$ intervals from $t_i=23$ to $t_i=25$ and from $t_i=26$ to $t_i=29$, etc . . . namely when the present sampling instant is at $t_i=26$; $t_i=27$; $t_i=30$; etc . . . . Thus, while the demand (FIG. 4B) has been ramping up from $t_i=23$ to $t_i=25$ due to the excursion of power at time $t_i=23$ (FIG. 4A), correction at time $t_i=25$ levels the demand until $t_i=26$. At this moment, however, the loss of power due to the deviation of power from $t_i=20$ to $t_i=21$ is felt as a ramp upward while it disappears with the tail of the windows in progress through $\Delta W$. Nevertheless, at the same time, a loss of power at time $t_i=26$ due to a disturbance causes the demand to ramp down. Assuming the two effects are of the same magnitude, the ramp up and the ramp down cancel each other. This is shown from $t_i=26$ to $t_i=27$ by a horizontal segment at level +LB in FIG. 4B. From $t_i=27$ to $t_i=29$ due to power being constant on the curve of FIG. 4A and the tail end of the window passing through a constant power level from $t_i=21$ to $t_i=23$, the demand curve of FIG. 4B follows a ramp down to the deadband −LB at which point control is exerted to restore load, since the lower deadband −LB otherwise could be exceeded. However, two opposite effects, again, are observed here. At the head end of the window, namely at time $t_i=29$, control by load restoration causes power to increase to the level DL (see FIG. 4A), and a concurrent disturbance is assumed to occur, bringing power well above DL. This will result in the demand increasing along a ramp rather than being leveled as planned by the corrective control. On the other hand, at the tail end of the window, namely at time $t_i=23$, the deviation of power upward, earlier recorded, is progressively lost, which means a ramp down for the operative point at times $t_i=29$ to $t_i=30$. If these two effects cancel out, the demand remains level with $-LB$ as shown on FIG. 4B.

From the example given by reference to FIGS. 4A and 4B it appears that an overcorrection at times 5–6 and 24–25 leads to either excursion beyond the deadband (times 7–11) or to excessive switching (times 26, et seq.).

Despite such observed overcorrection, by the use of the deadband LB (limit band) the control system according to the present invention will not experience the aforementioned drawback of frequent load manipulation of the loads, in particular where the plant has few large loads such as arc furnaces. In such case, the average power divided by the maximum demand, in the presence of a deadband, will no longer be near 100%. Nevertheless, the load factor will still be quite good. Thus, the control system will effect control at time $t_i=2$ on the basis of a projected power at the same level up to $t_{i+1}=3$ (dotted line on FIG. 4A) which leads to the conclusion that the demand (dotted line on FIG. 4B) will exceed the deadband limit $+LB$. More generally, the control system will shed when the projected demand is above (DL+LB) (time $t_i=2$) and restore when the projected demand appears to go below (DL−LB) (time $t_i=6$). Despite the overcorrection mentioned (FIG. 4B), if things work out symmetrically, the maximum demand will be DL+LB and the average power between DL and DL−LB, so that the expected load factor will be between DL/(DL+LB) and (DC−LB)/(DC+LB), or 2/(1+LB/DL) and (1−LB/DL)/(1+LB/DL). If LB/DL is assumed to be 0.05, which is a most favorable ratio (namely, a total deadband of ±5%), the expected load factor (namely, the load capacity available) will be between 1/1.05 and 0.95/1.05, or about 90 to 95%, which is very good for heavy loads such as previously assumed.

In practice, the size of the deadband LB is chosen as a compromise between control accuracy (closeness of the maximum demand excursion from DL to the value of DL) and the frequency with which loads are manipulated (turned OFF, i.e., shed, or ON, i.e., restored). Actually, this compromise is based on the fact that a load of value $P_t$ if turned ON (OFF) for a time $T_m$ will cause an increase (decrease) in demand (based on a window W) of $P_t T_m/W$. This relationship is used to determine reasonable values for LB, given the size of the load changes P available for manipulation and the length of time $T_m$ (minimum) desired between such load manipulations. The demand limit deadband LB is the primary performance parameter. A good initial value is $LB=P_t T_m/W$, so that one load manipulation can take the demand from the add or shed point to approximately the nominal demand limit DL. The above may be expressed as:

$$(LB/DL)=(P_t/DL)\times(T_m/W)$$

Assuming LB/DL is intended to be about 0.05 (thereby anticipating possible min/max demand ratios in the 90% range), and if $P_t/DL$ ratios of 0.25 (15 MW loads with ON/OFF control only and a 60 MW demand limit) are available, then, $T_m/W=0.05/0.25=0.2$ and, with $W=15$ minutes, $T_m$ 3 minutes. It is a reasonably assumption to expect load manipulations no oftener than 6 minutes (twice the 3 minute time, since the demand moves to the other side of the deadband), depending on other perturbations and disturbances in the plant power. This numerical example is illustrated by the power curve of FIG. 5A and the demand curve of FIG. 5B, where disturbances of 20% at times $t_i=2$ and $t_i=4$, and 40% at time $t_i=6$ are illustratively shown. Still it may be desirable to improve over the control mode indicated in FIGS. 4A, 4B since, as has been seen, the use of only one deadband parameter LB can result in continual load cycling and cause excursions of the demand outside the limit band.

Figure 6:
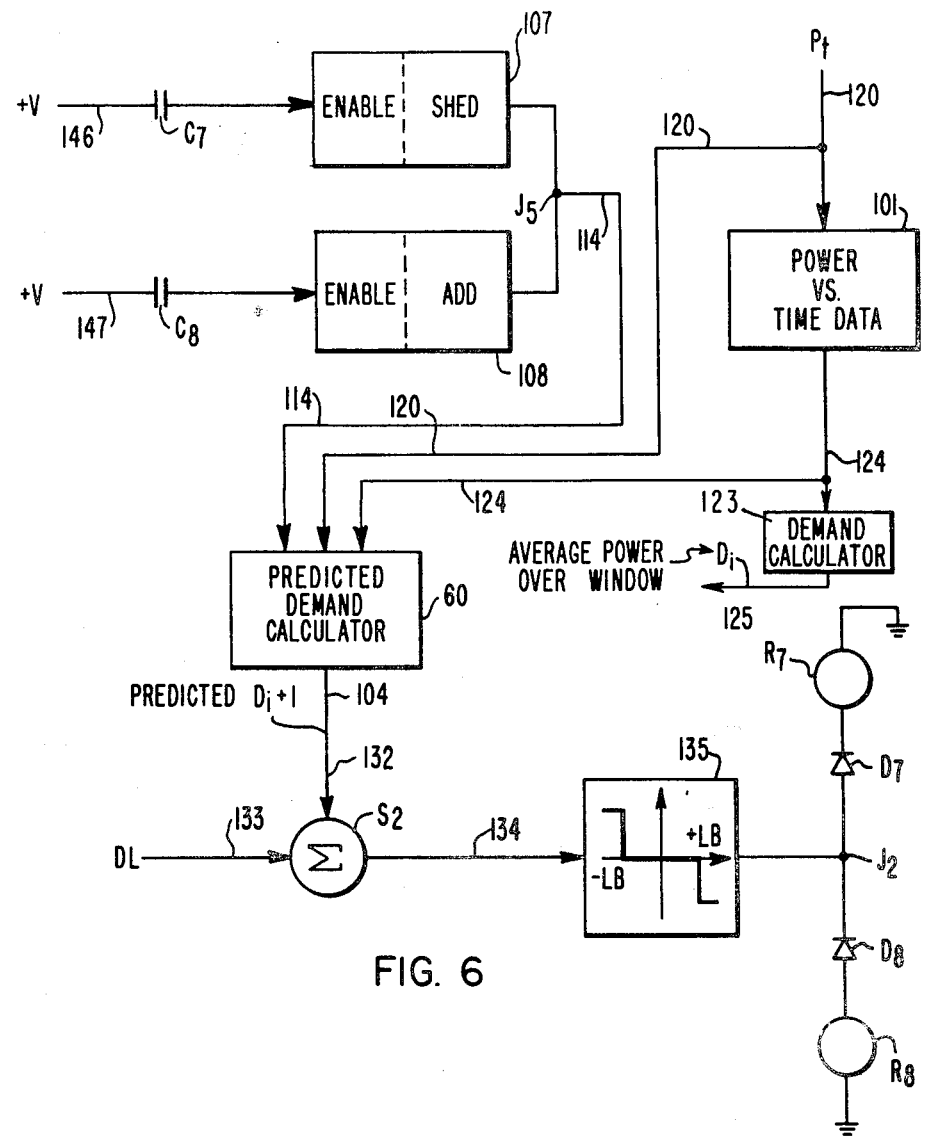
FIG. 6 is a block diagram illustrating two features in the control system of the invention.

Referring to FIG. 6, a block diagram is provided to illustrate basic control of the loads in the plant as effected by the computer system 6 of FIG. 1, assuming one load of value $P_L$ has been selected under the priority schedule to be shed (block 107), or added (block 108), in response to an error E existing between the assigned demand limit DL (line 133) and the actual demand Di+1 on line 104 as computed (block 60) by the computer 6. Such computation is in response to the instantaneous value $P_t$ derived on line 120 and to the accumulated power vs. time profile for a demand period W looking back into the past as derived by line 124 from block 101.

In accordance with the present invention, computer 6 first calculates the demand Di for the window ending at instant $t_i$ on the basis of the power $P_t$ recorded throughout the window W ending at instant $t_i$. This is performed by block 123 of FIG. 6 from the power or energy vs. the data maintained by block 101, in response to the instantaneous power $P_t$ derived on line 120 from the watthour meter. In accordance with the sliding window method, the calculation in block 123 is:

$$D_i = \frac{1}{W}\int_{t_i-W}^{t_i} P_t\, dt$$

This calculation, as referred to earlier, is accomplished by the sliding window demand indicator (SWDI), 100, of FIG. 1. Basically, block 101 continuously provides a record of N slices ($N=W/\Delta W$) of energy $E_{(\Delta W)}$ (FIG. 2) for N time intervals of length $\Delta W$, extending at time $t_i-W$ into the past and ending at instant $t_i$. In other words, block 101 of FIG. 6, provides the power (or energy) versus time for a window length into the past, at every sampling instant $t_i$. This value is available on line 124 for use by blocks 60 and 123. Blocks 60 and 123 both implement the demand calculation by an approximation of the form:

$$D_i = \frac{1}{W}\sum_{i=1}^{N} E_{(\Delta W)i}$$

The differences between 60 and 123 being the specific $\Delta W$ intervals corresponding to the sampling instants $t_i$.

On the basis of: (1) the output on line 124 from block 101; (2) the instantaneous power $P_t$ derived on line 120;

and (3) the available power $P_L$ on line 124 representing in the priority schedule a load selected to be shed, or added, at time $t_i$ (see blocks 107, 108), the demand $D_{i+1}$ at time $t_{i+1}$ is predicted by performing calculations in block 60 conceptually as follows:

Referring to FIG. 3A, the power Pi at instant $t_i$ is assumed (see dotted lines) to remain the same until instant $t_{i+1}$ which is the subsequent sampling instant, at a $\Delta W$ time interval later. Since block 101 maintains a complete power or energy profile by $\Delta W$ increments for a time W into the past, it is possible for block 60 to calculate the projected demand $D_i+1$ at time $t_{i+1}$ (i.e. for the "next window" as indicated in FIGS. 3A, 3B) under the assumption of a constant $P_i$, amount, or average, from $t_i$ to $t_{i+1}$. The calculation is in accordance with the formula:

$$D_{i+1} = \frac{1}{W} \int_{t_i + \Delta W - W}^{t_i + \Delta W} P_i dt$$

which is actually implemented as $$D_{i+1} = \frac{1}{W} \sum_R E_{(\Delta W)i} + \frac{1}{W} E_{(\Delta W)NEWEST}$$

Where the region R is the $(N-1)$ $\Delta W$ increments comprising the last window minus the oldest sample (FIG. 2) and where $E_{(\Delta W)NEWEST}$ is the value $E(\Delta W)$ for the $\Delta W$ interval ending at $t_i$, but extrapolated to $t_{i+1}$. The extrapolations of power and the resultant predicted demand are shown as dotted lines on FIGS. 3A, 3B, FIGS. 4A, 4B and FIGS. 5A, 5B.

The horizontal dotted line at operative points such as $t_i=2, 3, 4, 5, 13$ and 16 on FIG. 3A indicates that the power is predicted to be the same up to time $t_{i+1}=3, 4, 5, 6, 14$ and 17, e.g. during the "last" time interval $\Delta W$, which is considered on FIG. 4A for establishing the predicted demand $D_{i+1}$ for the "subsequent" window W, and is taken into account for possible control at such "present" sampling instant $t_i$.

The linear line, or range in dotted line, on FIG. 3B indicates the predicted demand $D_{i+1}$. If it exceeds the deadband limit LB, there will be control. If the predicted demand $D_{i+1}$ at time $t_{i+1}$ is outside the deadband LB, load correction is effected by controller block 107, to shed load if there is excess demand above DL+LB, or by controller block 108, to add load if there is a want of demand below DL−LB (FIG. 6). As a result of such shedding or adding of a load $P_L$, at time $t_{i+1}$ the calculations of block 60 may again take place (see line 114), using a suitable modified power extrapolation. This is repeated until the projected demand is within the +LB and −LB levels, or other constraints are reached. If the projected demand $D_{i+1}$ remains between levels +LB and −LB, no control will have taken place at sampling instant $t_i$. Most systems will only manipulate one load per sampling interval, and will initiate a load manipulation inhibit timer to inhibit further load manipulation until the first manipulation has had time to take effect.

Referring again to FIG. 6, the dead-band LB is exercised by function generator 135 in response to summer $S_2$ which compares the predicted demand $D_{i+1}$, derived via line 104 from block 60, to the demand limit DL derived from line 133. At the output of function generator 135 junction J2 reaches a threshold which renders conductive either diode D7, or diode D8. Diode 7 causes energization of a relay R7 which has contacts C7 enabling controller 107, while diode D8 causes energization of a relay R8 which has contacts C8 enabling controller 108. In actuality, load control by block 107, or block 108, is enabled in response to function generator 135 whenever contacts C7 or C8, close, e.g. whenever the deadband is exceeded on either side.

Operation of controller circuit 107, or 108, results in an amount of power $P_L$ indicated as shed, or added, on line 114 to block 60. Therefore, the computer system 6 is able to determine the effect this will have on the demand D, thus, to predict before the next sampling instant where the demand is going to be in the system. If the load being controlled is a furnace, load regulation can be made together with load selection and load shedding or restoring in accordance with the teachings of U.S. Pat. No. 4,204,127. In the preferred embodiment, though, as earlier stated, load switching operates on a plurality of electric furnaces in accordance with U.S. Pat. No. 4,181,950, as a last-on first-off (LOFO) adaptive load priority determination system. Preferably, each production load, for instance an arc furnace, has a user-adjustable response time allocated to allow for the time it takes for the load to change its power consumption when adjusted. Thus, a furnace is normally set for 10 or 20 seconds to allow for electrode travel time or tap changer travel time, as the case may be. The computer system 6 will then determine the effect of shedding or restoring a load based on the current load kilowatts (if it is to be shed), or of load kilowatts already taken away (if it is to be added). Nominal load kilowatts are taken into consideration if a "new" load in the order of selection is a furnace that had been tapped. On such basis, if it appears to the computer system that shedding, or restoring only one load will be effective to modify the projected demand to an acceptable value, the computer system 6 will wait the affixed load response time before deciding whether to shed or restore other loads. Also, each load may be given a user-adjustable "maximum time between kilowatt-hour pulses". The load will be considered OFF and using zero power unless a KWH pulse is received from that particular load at least that often, and the zero value used as the effect of manipulating the load.

Since some loads can be not only turned ON, or OFF, but also adjusted in their power consumption, for instance via a tap changing transformer, by shed or restore (or add) is meant to hereby reduce, or increase power consumption, as well. Typically, the computer system 6 will control furnace taps in groups with a total, for instance, of four of five tap selecting outputs per furnace. Basically, with a Last/ON/OFF-First/OFF-/ON (LOFO) priority structure, loads are shed on a Last-ON/First-OFF basis while they are restored on a Last-OFF/First-ON basis. If under demand control the computer system has shed one or more loads, any new automatic mode load is inhibited from being brought on line until all previously shed loads have been restored. The controller keeps track of the new load being called and starts the new load after restoration of all loads previously shed, provided the new load will not put the demand over the demand limit DL. A "start heat" pulse is inputted into computer system 6 to make it recognize the upcoming "new load". Also, as explained in U.S. Pat. No. 4,181,950, any particular load may become "protected" at any time there is a load that is the last one to be turned ON (hence the next to be shed) and a load that is the last one to be turned OFF (hence the next to be restored). If, by operator command a load has become "protected", if ON it is moved to be in the "last to be shed" position; if OFF, it is moved to be in the "first to be restored" position. A load may also be in a "refine" state, namely a status by which it should not be shed or disturbed until all loads of different status are shed. An output signal may be derived from each load to indicate when it is "next" to be shed, and such indication may be subject to a "protect" or "refine" status to the effect of removing the particular load from the "next-to-be-shed" position (assuming other sheddable loads exist). More generally, the priority order of the loads, and treatment of the loads in accordance with such priority order is part of the selection internal organization described in U.S. Pat. No. 3,872,286 of Putman or in U.S. Pat. No. 4,181,950 of Carter.

More specifically, the preferred embodiment of the invention is a sliding window LOFO computerized power demand control system of the adaptive load priority determination type like in U.S. Pat. No. 4,181,950, similar as far as priority selection and management are concerned, but different in the manner decisions to shed or restore are handled by the computer system 6 because it is not a fixed demand period and rather a sliding window demand determination system.

In accordance with the present invention, (see FIGS. 3A and 3B) the power vs. time data are stored only at instants ..., $t_{i-1}$, $t_i$, $t_{i+1}$ ..., regularly spaced by a selected amount of time $\Delta W$ where $W = N\Delta W$. Typically, if $\Delta W$ is a few seconds, and the demand period, or window, is say 15 minutes, there may be a few hundred of such time intervals. Accordingly, once every few seconds the computer system 6 takes into account the data derived from the KWH meters in the plant, and operates in the manner just described or in the improved manner yet to be disclosed herein.

As previously mentioned and as indicated in FIGS. 4A, 4B, the simple deadband LB in the demand limit method and apparatus (illustrated in FIG. 6) can lead to overcorrection and excessive load switching. Therefore, in addition to the upper and lower demand deadband limits +LB and −LB about the demand limit DL and in relation to demand curve $(D_t)$ of FIG. 3B, the control system according to the present invention, further provides for a power deadband PB defined by levels PB, PB' above and below the power curve (P) of FIG. 3A. The power demand PB which delineates instantaneous upper and lower limits for the power curve (P) is distinct from the demand deadband LB. PB allows the system to recognize the need for an "early" correction since by looking at the instantaneous power as well as to the averaged power it permits the system to avoid over-correction. In that case, PB works as a stabilizing rate feedback applied to the highly non-linear response of the sliding window demand controller when operative on a large load increment. More generally, PB defines a "noise" power band outside of which a significant change in demand is deemed to be in progress. The derivation of PB as such indicative parameter, is put to advantage by initiating an early control action to avoid overcontrol and an oscillatory behavior which would likely ensue with a tight action in opposite directions about a common level DL, as typical with a sliding window control system (see FIGS. 4A, 4B). As a good approximation, PB should be set as large as possible subject to the condition that it remains less than about half the smallest significant load change.

At this point it should be noted that PB, LB, and DL all have the units of power (or energy/time) and that no inconsistency arises from a demand (average power) dimension on a power axis. Indeed, a constant power P will eventually (after a time W) cause at least one demand value of P.

The present invention provides for a more sophisticated control scheme to keep the demand within the limits +LB, e.g. (DL+LB), and −LB, e.g. (DL−LB), with a reduced number of load manipulations. Such control scheme is as follows:

First, a load is selected from the priority schedule by the computer system which is to be shed under controller 107 at sampling instant $t_i$ if:

(I/a)—the projected demand $D_{i+1}$ at $t_{i+1}$, exceeds (DL+LB), e.g., is in excess of the assigned demand limit DL by at least the amount LB of the deadband earlier mentioned; or (I/b)—the demand $D_i$ appears at instant $t_i$ to be increasing and it also appears that the projected demand will exceed the demand limit DL (without deadband) at time $t_{i+1}$, while at sampling instant $t_i$ the operative point on the power curve (P) is already in excess of (DL+PB), where PB is an upper deadband limit for curve $(P_t)$.

Secondly, a load is selected from the priority schedule by the computer system which under controller 108 is to be added at sampling instant $t_i$ if:

(II/a)—the projected demand $D_{i+1}$ at $t_{i+1}$, goes below −LB, the lower deadband of curve $(D_t)$, namely is reduced by more than (DL−LB), or (II/b)—the demand $D_i$ appears to be decreasing at time $t_i$ and it appears further that the projected demand will go below the demand limit DL (without deadband) at time $t_{i+1}$, while at sampling instant $t_i$ the operative point on power curve $(P_t)$ is already under (DL−PB), where PB is the lower deadband limit for curve (P).

Control steps I/a and II/a represent a basic sliding window control and have been explained by reference to FIGS. 3A, 3B and 6. Control steps I/b and II/b represent significant improvements to the basic control which will now be explained by reference to FIG. 7.

Figure 7:
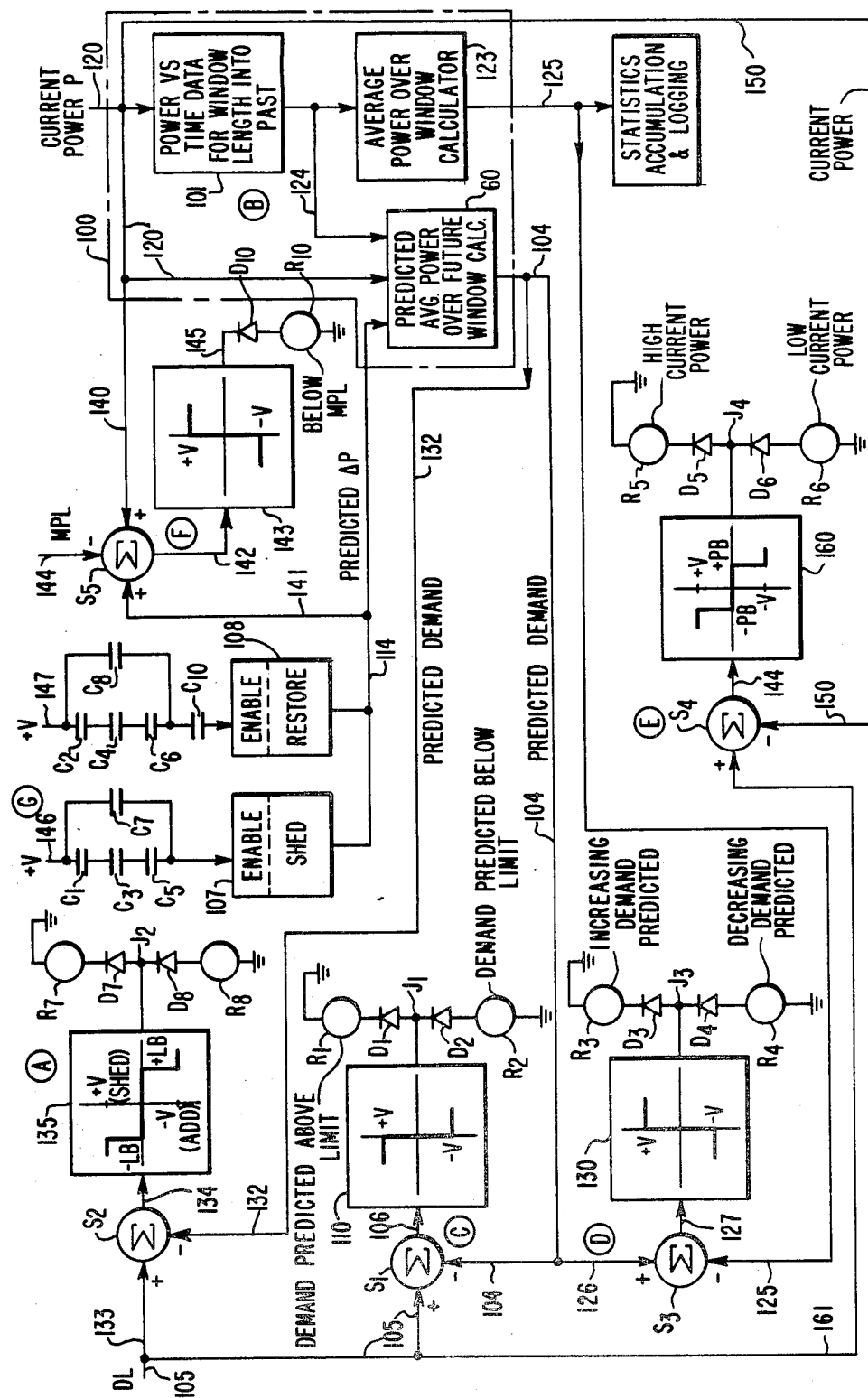
FIG. 7 is a block diagram like in FIG. 6 with several additional features included.

Referring to FIG. 7, the shed controller 107 of FIG. 6 is shown here to be enabled by a series of contacts $C_3$, $C_5$, $C_1$ connected in parallel with contacts $C_7$. Contacts $C_3$, $C_5$, $C_1$ and $C_7$ belong to respective relays $R_3$, $R_5$, $R_1$ and $R_7$. The restore controller 108 of FIG. 6 is now shown to be enabled by dominating contacts $C_{10}$ placed in series with contacts $C_8$, and also with a series of contacts $C_2$, $C_4$, $C_6$ the latter being in parallel with contacts $C_8$. Contacts $C_2$, $C_4$, $C_6$ and $C_{10}$ belong to respective relays $R_2$, $R_4$, $R_6$ and $R_{10}$. FIG. 7 is a block diagram explaining how relays $R_1$-$R_7$ and $R_2$-$R_{10}$ are selectively controlled to perform the aforementioned steps I/a; I/b; II/a; II/b.

As already described by reference to FIG. 6, which includes only $C_7$ and $C_8$ implementing I/a and II/a, the deadband LB is established around the demand limit DL by function generator 135 controlling steering diodes $D_7$, $D_8$ which actuate either relay $R_7$, or relay $R_8$, depending upon the sign of the error at the output of summer $S_2$. The latter, by lines 132 and 133, compares DL with the predicted demand from block 60. Present power $P_i$ is also fed, via line 120, (into the sliding window demand indicator (SWDI) 100 of FIG. 1) assisting with block in providing a profile of power vs time (Pv.t) throughout the window W just ending at time $t_i$ and with block 123 in providing the demand for W just ending. The (Pv.t) profile on line 124 is used by block 60. The output, on line 114, from the shed and restore controllers 107, 108 is indicative of how much power is being shed, or restored. It is applied for updating into block 60, thereby estimating how much the consumption will change due to any control actions taken. Block 60 on this basis calculates the average power for the window W starting at $t_{i-W+1}$ and terminating at $t_{i+1}$.

Let us assume that the basic control mechanisms of I/a and II/a previously explained with reference to FIG. 6 did not result in the activation of relay R7 or R8, i.e. the predicted demand error out of summer $S_2$ is within the deadband limits ±LB relative to level DL. It is observed that the predicted demand $D_{i+1}$ on line 104, at the output of block 60, is compared with the demand limit DL of line 105 by summer $S_1$ and the determination is made by function generator 110 whether the predicted demand is above, or below, the demand limit DL. From junction $J_1$ function generator 110 gates diode $D_1$, or diode $D_2$, thereby to energize a relay $R_1$ if the error is above, a relay $R_2$ if the error is below the demand limit.

When the relay $R_1$ is actuated, contacts $C_1$ are closed which is one of the three I/b conditions for enabling control by controller 107 to shed load. When relay $R_2$ is actuated, contacts $C_2$ are closed which is one of the three II/b conditions for enabling control by controller 108 to add load. In addition, it is observed that block 123 responds to the output from block 101 on line 124 and establishes the demand (average of the power over the demand period W) in the window initiated at $t_{i-W}$ and ending at $t_i$. Thus, on line 125 at the output of block 123, the actual average of the power (demand) $D_1$ for the present window W ending at present sampling instant $t_i$ is derived. When the output of line 125 is compared by summer $S_3$ with the output of block 60 on lines 104, 126, function generator 130 determines via steering diodes $D_3$, $D_4$ and respective relays $R_3$, $R_4$, whether the demand $D_i$ is at the time $t_i$ increasing, or decreasing. In the first instance, relay $R_3$ is energized through diode $D_3$ and by contacts $C_3$ a second I/b condition is established allowing controller 107 to shed load $P_L$. In the second instance, relay $R_4$ is energized through diode $D_4$ and by contacts $C_4$ a second II/b condition is established allowing controller 108 to restore load $P_L$. The third condition for control under I/b or II/b is that the power at time $t_i$ is above (DL+PB) (step I/b), or below (DL−PB) (step II/b). The deadband PB is exercised in response to function generator 160 and from junction $J_4$ by steering diodes $D_5$, $D_6$ onto respective relays $R_5$, $R_6$. Function generator 160 is responsive to the output 144 of summer $S_4$ which compares the signal indicative of demand limit DL on lines 161 and 105 to a signal indicative of current power on lines 150 and 120.

Steps I/a or I/b and, in the alternative, steps II/a or II/b, will now be explained by reference to the curves given in FIGS. 3A, 3B, FIGS. 4A, 4B, and FIGS. 5A, 5B. It is recalled that these curves respectively, are in each couple of Figures, the power curve $P_t$ and the demand curve $D_t$ plotted as a function of time upon each sampling instant $t_i$ throughout the continuously sliding window W, e.g. the unit of time on the horizontal axis is given by ΔW=1. FIGS. 4A, 4B relate to control steps I/a or II/a, whereas FIGS. 3A and 3B, or 5A and 5B, illustrate control operation in accordance with I/b or II/b.

Referring to FIGS. 4A, 4B, the window W is 6 units long and ΔW is 1 unit long. At time $t_i=1$, following a long time of operation at a power assumed to be just equal to the level DL, a load increase D takes place in the plant. As a result the demand follows a ramp and at $t_i=2$ has increased to DL+LB since power is continuing at the DL+D level. The demand is projected (FIG. 4B) at $t_i=3$ to be DL+2LB. Hence, at the time $t_i=2$, a load $P_1$ of value PL=D is shed. The predicted demand at power level DL is now (DL+LB) and no further shed action is taken.

At $t_i=3$, the predicted demand is still at (DL+LB) for the predicted power DL and so no action is taken. The same is true at time $t_i=4$. Just after $t_i=4$, the disturbance D is removed. At time $t_i=5$, the demand has therefore been reduced to DL and it is projected to be (DL−LB). Therefore, no action is taken. At time $t_i=6$, then, the demand has reached (DL−LB) and it is projected to be (DL−2LB). The load $P_1$ of value $P_L=D$ is thus restored, raising the demand projection to (DL−LB), indicating no further restorations are required.

At $t_i=7$, conditions are such that the projected demands is (DL−2LB), indicating need to restore. However, disturbance D has come and gone and that load $P_1$ has been shed and restored. It is assumed that there is nothing to restore! Hence at $t_i=8$, the demand drops to (D−2LB) and stays there until times $t_i10-t_i12$, when the low power period of $t_i4-t_i6$ works its way out of the window.

Thus, using only methods I/a and II/a, a single simple disturbance coming and going can cause the time control action to overcurrent (or attempt to). Ideally, load $P_1$ should have been restored at $t_i=5$ instead of $t_i=6$.

FIGS. 4A, 4B also show events ($t_i=19$–30) corresponding to an initial load reduction disturbance initiating a load $P_2$ to be turned on (at $t_i=21$) followed by, after the disturbance goes away at $t_i=23$, two shedding steps ($P_2$ at $t_i=25$ followed by another load $P_1$ at $t_i=26$) followed by two restore steps at $t_i=27$, etc. With the simple method of I/a and II/a the system is easily perturbed, as indicated by the curves of FIGS. 4A, 4B. It appears that a corrective action is not removed soon enough. This entails a new, larger, disturbance when the window has slid past the original disturbance but not past the corrective action. FIGS. 3A, 3B and 5A, 5B show how the improved method of I/b and II/b for the same disturbances act to overcome this.

Referring to FIGS. 3A, 3B, FIGS. 5A, 5B and FIG. 7, up to time $t_i=1$ the system is such that the demand curve $D_t$ is at the level DL assigned to the plant, and the power curve $P_t$ maintains itself at a level corresponding to such demand limit. At time $t_i=1$, it is assumed the power abruptly rises from the quiescent level to the level indicated by aa′ on the $P_t$ curve (FIG. 3A). Power remains constant along a′b from $t_i=1$ to $t_i=2$, which means that the demand curve $D_t$ (FIG. 3B) increases correlatively to the area gained under a′b on the power curve. Thus, at time $t_i=2$, the operative point on the demand curve $D_t$ is B. Under the control scheme of FIG. 6, at time $t_i=2$, power is assumed to remain the same until $t_i=3$, thus, along bp. Therefore, the demand is predicted at time $t_i=2$ to follow BP. The prediction is done by block 60 of FIG. 6. On this basis, beyond time $t_i=2$, the predicted demand BP will exceed the deadband +LB, so that control at instant $t_i=2$ is in order by controller 107 (FIG. 6) to shed load. As a result, power now drops along bb′ (FIG. 3A) and the actual demand will follow BC, (FIG. 3B), rather than the expected line BP. Assuming the correlative reduced power maintains itself from b' to c between times $t_i=2$ and $t_i=4$, BC is indeed level with the assigned limit DL.

If, however, at time $t_i=4$ another disturbance cc' occurs in the opposite direction, the predicted demand will be along CD. Still, the opposite deadband will not be reached, at least until E (ramp in dotted line) at time $t_i=6$ on the demand curve $D_t$ (FIG. 3B).

It is at $t_i=5$ that FIGS. 3A, 3B and 4A, 4B start to differ from each other. It is recalled that in FIGS. 4A, 4B, the load restoration at $t_i=6$ should have been at $t_i=5$. It did not happen, though, because under the scheme of FIG. 6 at time $t_i=5$ the deadband $-LB$ has not been exceeded yet.

FIGS. 3A, 3B show control operation in accordance with the improved block diagram of FIG. 7, e.g. taking advantage of the additional features provided to prevent the aforementioned two drawbacks of the scheme according to FIGS. 4A, 4B and 6.

Referring to FIG. 7, which is to be considered by reference to FIGS. 3A, 3B, enabling of controllers 107 and 108 by respective contacts $C_7$ and $C_8$, respectively, is effected like in FIG. 6, ignoring for the moment contacts $C_{10}$ and relay $R_{10}$ associated with controller 108 of FIG. 7.

First, from C to D the demand decreases linearly since power is established at the lower level c'd. At time $t_i=5$, though, control will be effected to bring power from d to d' and the demand will return along DE', rather than along DE as if it were under the FIGS. 4B and 6 scheme. As shown in FIG. 6, no control takes place at time $t_i=5$ since, while projection DE, if c'd would continue as predicted, would not exceed the deadband $-LB$, contacts $C_8$ would not have to close, therefore, not to enable controller 108. Still, the drop of power cc' has in fact exceeded the level $DL-PB$ at time $t_i=5$, and with the control scheme of FIG. 7 function generator 160 is allowed to close contacts $C_6$ in relation to controller 108. Moreover, at time $t_i=5$, DE as projected would deviate below the level DL so that function generator 110 of FIG. 2 will cause by diode $D_2$ relay $R_2$ to close its contacts $C_2$. Thirdly, the demand is decreasing as indicated by the projection along line DE. Therefore, function generator 130 will cause, by diode $D_4$, relay $R_4$ to close its contacts $C_4$. Concurrence of closed contacts $C_2$, $C_4$ and $C_6$ entails enabling of circuit 108, and it follows that at time $t_i=5$ load control will bring the operative point on the power curve from d to d'. As a result, at time $t_i=6$, power will still be back to the level DL. The desired early restore has been achieved.

The indentation F G H I shown by a phantom line on FIG. 3B chosen to correspond to FIG. 4B, is now brought upward into the deadband at F' G' H' I' (see FIG. 3B). In the same fashion, compared with the control actions effected under the FIGS. 6 and 4A, 4B scheme at times $t_i=2$; $t_i=6$; $t_i=21$; $t_i=25$ and $t_i=29$, control actions under FIGS. 7 and 3, 3B involve an early control at times $t_i=5$ and $t_i=16$, thereby to overcome any excursion beyond the deadband such as at times $t_i=7$ to $t_i=11$. It is observed that $t_i\geq20$ of FIG. 4A are equivalent to $t_i\geq12$ of FIGS. 3A, 3B.

Figure 5A:
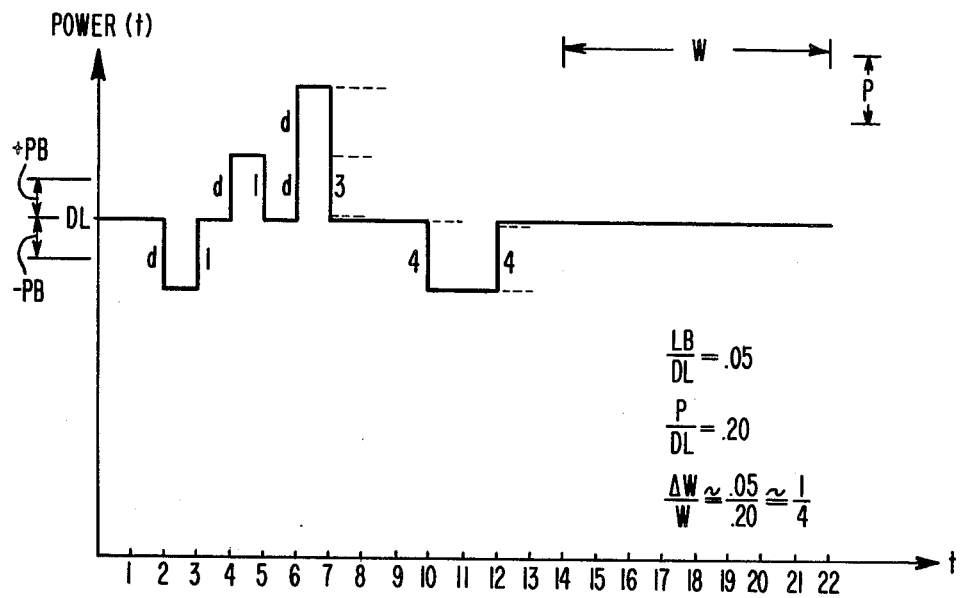
FIGS. 5A and 5B show with the control system according to the invention a response to 20% and 40% disturbances as in the case where a 5% deadband limit is used for a ratio of the available power to the demand limit of 20%, the window being eight time intervals long and the load minimum time being one fourth the duration of the window.
Figure 5B:
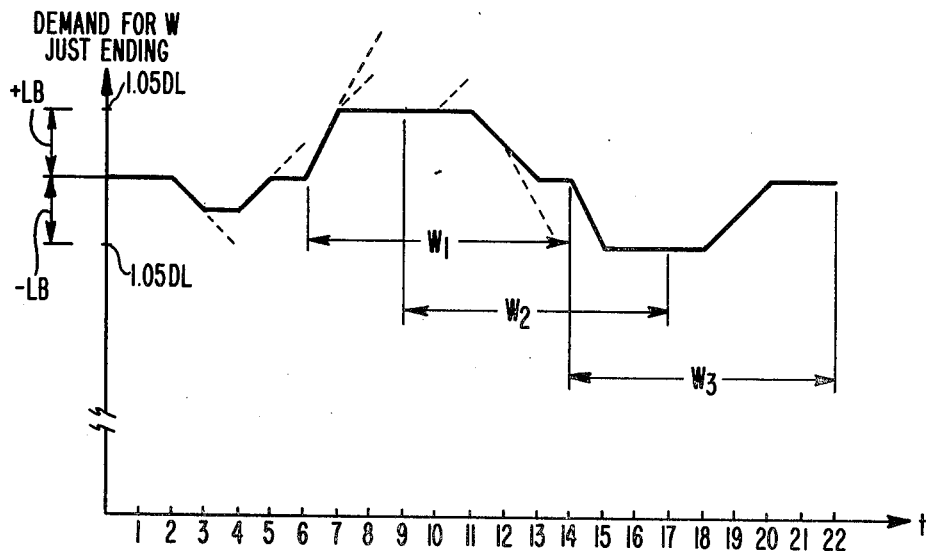

Referring to FIGS. 5A, 5B, the power and demand curves ilustrate control in accordance with the scheme of FIGS. 7 and 3A, 3B for the following ratios: $LB/DL=0.05$; $P_L/DL=0.20$ and $T/W=0.05/0.20=\frac{1}{4}$. This corresponds to a $\pm 5\%$ limit band and a time T (minimum) desired between load changes of W/4 deadband. Disturbances in the power of 20% at times 2 and 4 and of 40% at time $t_i=6$ are shown as illustration. Three windows of 8 minutes are also shown W1; W2 and W3 which end at times 14; 18 and 22, respectively. Control is effected at times 3, 5, 7, 10 and 12, in accordance with the proposed scheme.

Sliding window control systems, especially those which operate with a few large loads, might enter a full-ON, full-OFF, full-ON, full-OFF oscillating cycle, in which the first full-OFF status occurs at random while the first full-ON status becomes an attempt to use the unused energy in the first full-OFF status. As the window slides, the established full-ON status is reflected by the control system as belonging to the earlier portion of the window, thus forcing control to impose another full-OFF condition. The cycle repeats itself. In order to prevent this, a maximum power limit (MPL) is assigned to limit the extent to which high power usage can be used to compensate for low power usage. This is achieved by relay $R_{10}$ and its contacts $C_{10}$ as shown in FIG. 7. Summer $S_5$ compares present power, on lines 120, 140 (adjusted by the predicted power change $\Delta P=P_L$ on lines 141 and 114 from the restore controller 108) to the maximum power limit MPL inputted from line 144. The summer $S_5$ output on line 142 is applied to function generator 143, by line 145 establishes a forward bias on diode $D_{10}$ as long as power is below MPL, thereby allowing control via closed contacts $C_{10}$. Indeed, whenever MPL is exceeded, diode $D_{10}$ is blocked and contacts $C_{10}$ are opened, thereby preventing load restoration by controller 108.

Having considered the hardware aspect of the control system according to the invention, consideration will now be given to the software components of the computer system referring in particular to the flow chart of FIG. 8.

The flow chart is based on a demonstration control program, which is provided to explain the operation of the control system of the present invention. Symbols in the flow chart of FIG. 8 are steps referred to in the listing attached hereinafter in Appendix using the same reference numerals.

Figure 8A:
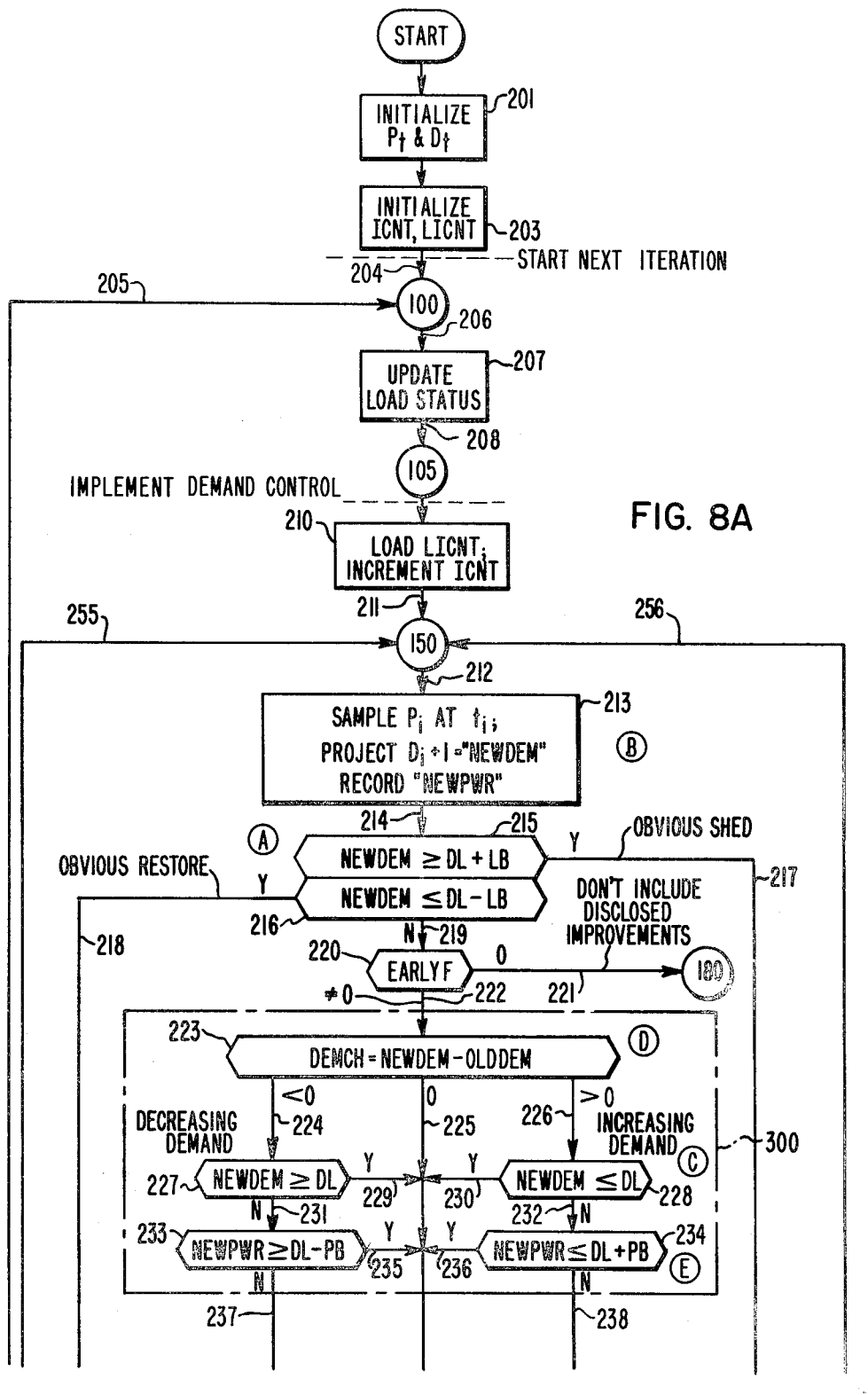
FIGS. 8A and 8B are a flow chart illustrating the operation of the control system under the control scheme of FIGS. 3A, 3B, 4A, 4B, 5A, 5B, 6 and 7.
Figure 8B:
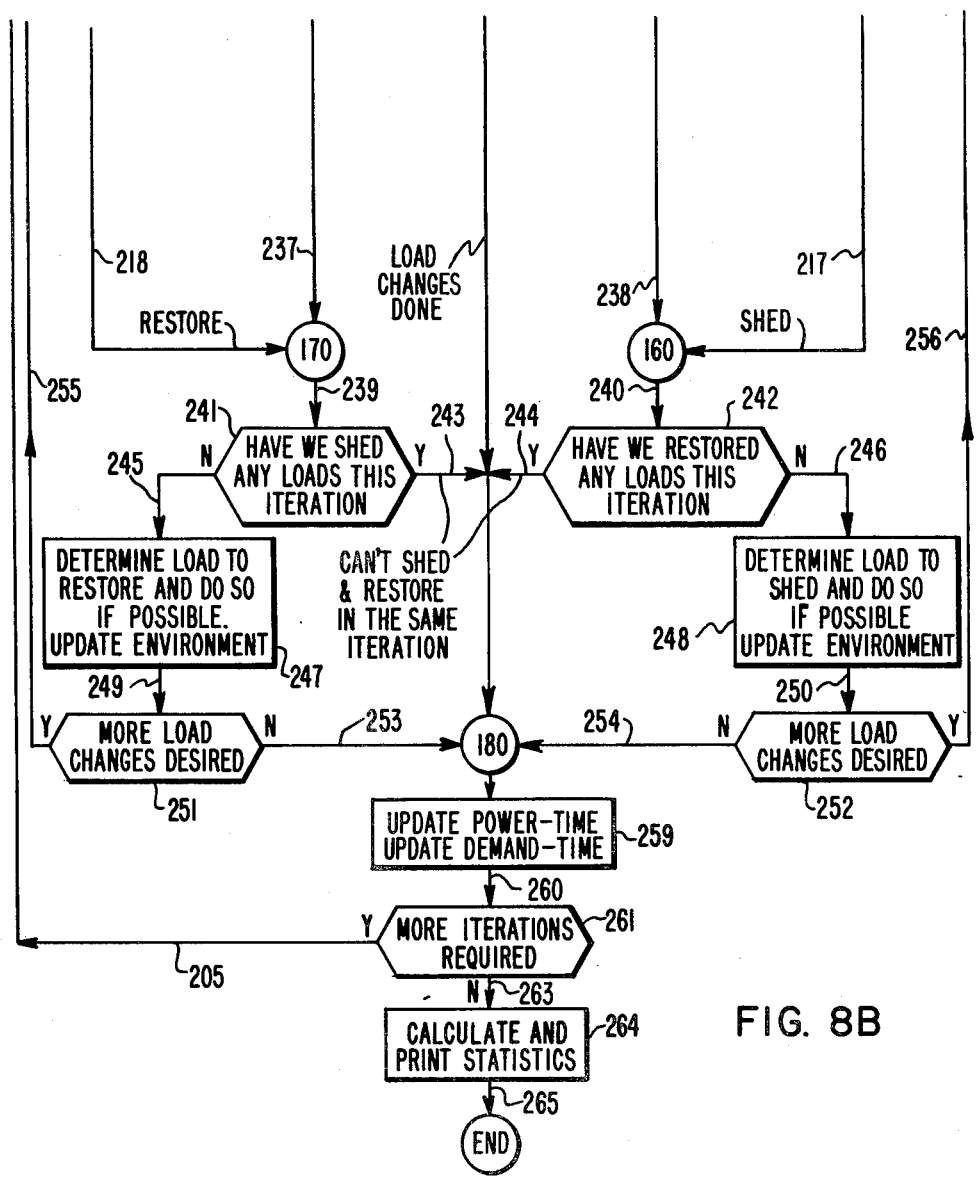

FIG. 8 includes circled areas A through E which indicate the implementation of the features of FIG. 7 identified in the same way. In the demonstration program of FIG. 8, the region extending from symbol 150 (line 211) through symbol 180 (line 257) illustrates an embodiment of both methods I and II for either steps a and b.

At the start, the system goes to block 201 where the power curves ($P_t$) and ($D_t$) of FIGS. 3A, 3B or 5A, 5B receive their initial conditions, e.g., on account of the number of loads initially ON, under AUTO or on MANUAL, the accumulated demand, the demand limit DL, the deadbands LB and PB, so that at the initial stage the initial conditions have been established for an entire window W into the past. Then, in block 203, the iteration counters ICNT, for $t_i+1$, and LICNT, for $t_i$, are preset, e.g., initialized, to the values they would have at the end of the first window. When this has been done the system is ready for successive iterations to start at line 204. Each reset iteration is based on a window W which has slided by $\Delta W$ (DT in the listings attached in Appendix) from the window just considered during the last iteration. Each new iteration at symbol 100, is started from block 261 as explained hereinafter. Upon each iteration the system at block 207 updates the load status array (LSA) according to contacts such as 7, 10 and $CO_1$, $CO_2$ in FIG. 1. This is effected for all the loads in order to reflect actual operation and load changes. In the simulation shown in FIG. 8, the load status array is updated in accordance with a load prameter array providing a preprogrammed load status as a function of time. Then, the flow chart goes to symbol 105, where the system is ready to implement demand control in accordance with the present invention. First, at block 210, the window is slipped an amount DT by having the value from ICNT loaded into LICNT and the value of ICNT is incremented to simulate the next sampling time $t_{i+1}$. Other initializations are also done from window $W_i$ to $W_{i+1}$. Then at symbol 150 the system proceeds with demand $D_i$ (DEM), power $P_i$ (PWR) and error determinations according to the present invention. Within block 213, based on new power $P_i$ reading being made at sampling time $t_i$, a projection of the demand $D_{i+1}$ is calculated assuming that the same new power at $t_i$ is maintained until time $t_{i+1}$ (as indicated by the dotted lines in FIGS. 3A, 3B, FIGS. 4A, 4B, and FIGS. 5A, 5B). The projection establishes $D_{i+1}$, called NEW DEM in the attached computer program.

Blocks 215 and 216, then, implement the basic deadband control of FIG. 6 (methods I/a and II/a). At block 215, the question is whether "NEW DEM≧DL+LB". If it is YES, this means that the demand $D_t$ is going to exceed the deadband +LB at time $T_{i+1}$, and there is a need to shed load $P_L$ in order to compensate for the imbalance detected. To this effect, by line 217 the system goes to symbol 160 with the order to shed (by 107 of FIG. 6 or 7). For this purpose, from symbol 160, a question is first resolved as to whether loads have been restored during the current sampling period. If this had happened, no shedding is now contemplated thereby avoiding an alternation of adding and shedding operations while controlling the loads. If the answer is NO, then it will be possible to go to block 248 and determine which load can be shed and do it. After this, all logs and load states are updated accordingly, and, the question is raised whether there are more load changes desired. If YES, another iteration starting at symbol 150 is initiated.

If instead of a YES at block 215, the question is a YES in block 216 to the question "whether NEW DEM≧DL−LB", this means that the demand $D_t$ is going to pass below the deadband −LB at time $t_{i+1}$. Therefore, there is a need to add loads in order to compensate for the imbalance detected. Accordingly, by line 218, the system goes to symbol 170, where the question is resolved whether any load has been shed during the current iteration. If there has been any shedding, no control will be made which by restoring the load would in fact create an ON/OFF alternation of operative steps with the loads. If there has been no shedding, at block 241 the answer is NO and the system goes to block 247 where it is determined what load $P_L$ should be restored, and the command is to restore such load if possible $P_L$ (via controller 108 of FIG. 4 or 5). At the same time updating of the load array status and log status is effected. At block 251, the question becomes whether there are more load changes desired. If YES, another iteration starting at symbol 150 is indicated.

If NO, at block 252 (when shedding is involved) or at block 251 (when adding is involved), the system goes to symbol 180. The system also goes to 180 after blocks 215 and 216 if "EARLY F" is zero (indicating "NO") in block 220. EARLY F is an indicator for the simulation to either include (EARLY F≠0=YES) or not include (EARLY F=0=NO) the improved features of I/b and II/b—circled C,D, and E areas of FIG. 7. If the EARLY F in block 220 says YES, the system goes instead by line 222 to a flow chart section illustrated in FIG. 8. Section 300 details the I/b and II/b improvements in the control system according to the invention the operation of which will be described hereinafter.

At any rate, eventually the system reaches symbol 180 for which load changes have been in fact completed. Accordingly, from symbol 180 the system goes to block 259 at which $P_i$ and $D_i$ are updated for iteration ICNT (sampling time $t_i$). Thereafter, block 261 determines whether more iterations are required, i.e. whether the simulation is over. If it is not, the system goes to symbol 100 at the beginning of the next iteration. If it is, at block 264 the results are calculated and printed and the program simulation ends.

The improvements of FIG. 7 will now be discussed.

Referring now to section 300 of FIG. 8, the system enters at block 223 where DEMCH=(NEW DEM−OLD DEM) is determined, e.g., the difference between the demand $D_i$ at instant $t_i$ and the projected demand at $t_{i+1}$. This comparison indicates whether at time $t_i$ the demand has been increasing (>0) or decreasing (>0) or has remained constant (=0). If the demand has been increasing, the system goes to block 228, e.g., comparing the new demand (NEW DEM) to the demand limit DL. If the demand limit DL is projected to not be exceeded, no control is exercised, and the system goes directly to 180. If, however, NEW DEM>DL, then, from block 228 the system goes to block 234. At block 234 the instantaneous power level is evaluated (with respect to the power band PB around the demand limit power DL) to see if a significant effort to lower demand is in progress. That is, in block 234 a deadband PB is imposed above the demand limit DL before any control. Thus, if NEW PWR≦DL+PB the answer is YES and the system goes directly to 180. If, however, NEW PWR>DL+LB, the answer is NO and the system goes to symbol 160 for load shedding.

Similarly, if the demand is decreasing the line of control is from block 223 to 227 where NEW DEM≧DL is established. Now if the demand while decreasing is projected to be below DL, then there may be a need for early correction and the system goes to block 233 where the power level is tested by NEW PWR≧DL−PB. If the deadband is exceeded downward, (i.e. the power level is low) the system goes to symbol 170 for load restoration.

In Appendix, a program listing is provided which represent a simulation of control operation based on the flow charts and Figures just discussed. In the program listing the following code is employed:

ICNT: iteration counter (time $t_i+1$)
LICNT: iteration counter (time $t_i$)
DT: for time intervals ΔW separating two successive sliding windows
LSA: load status array
DTP: Demand-time profile $D_t$ (FIGS. 3A, 6, 7, 8)
PTP: Power-time profile $P_t$ (FIGS. 3, 3A, 6, 7, 8)
LS=load shed
LR=load restore Also, for the sake of clarity, the essential features of the present invention are identified as follows:

A/ at blocks 215, 216 in FIG. 8; at block 135 in FIG. 4. This is a basic ON/OFF with deadband control and may be obvious to skilled designers.

B/ at step 213 in FIG. 8; at block 60 in FIG. 6. This is an extension of predictive methods to the large load sliding window.

C/ at blocks 227, 228 in the flow chart of FIG. 8, and at block 110 in FIG. 7.

D/ at block 223 of FIG. 8 and in block 130 of FIG. 7.

E/ at blocks 233, 234 in FIG. 8, and in block 160 of FIG. 7.

F/ at block 143 in FIG. 7. The maximum power limit was not simulated in the program of FIG. 8.

G/ The application of the above to a situation of a few large production loads, as contrasted to many small intermittent loads.

H/ The addition of a load response time parameter to inhibit further load manipulations until the first manipulation has a chance to take effect.

I/ Symmetrical deadband where the + and −LB points are not necessarily equidistant from DL and/or the + and −PB points are not necessarily equidistant from DL.

J/ Dynamic adjustment of the active limits +PB, −PB, +LB, and −LB as a function of the load next to be manipulated in the priority schedule.

The program of FIG. 8 has been executed for seven different cases both with and without the improvement of section 300. As indicated on the Data Summary herebelow, it appears that it is possible, by properly adjusting the system, to achieve very significant reductions in the number of sheds (reducing them by about 80%, with the attendant decrease in wear and tear on the equipment), and at the same time realizing a significant increase in the average power for the same value of peak demand. It appears that this increased power would be the equivalent in terms of steel production of several tens of tons of production a day, with a very significant economic value.

DATA SUMMARY

Base Conditions 5 loads @20 MW meltdown, 5 KW refine. Heat times of 30, 35, 40, 45 and 60 minutes
Base load of 20 MW in addition to the above
Demand limit of 65 MW

Operating Conditions

Runs 1, 2 have same set of initial conditions
Runs 3-14 have the same set of initial conditions
EARLY F=0 implies without disclosed improvements
EARLY F=1 implies with disclosed improvements (I/b) and (II/b)
All runs for 200 minutes with 15 minute window sliding at 1 minute iterations.

| RUN # | LB | PB | EARLY F | # SHEDS | AVG PWR | PK DEM |
|---|---|---|---|---|---|---|
| 1 | 3.3 | 10.0 | 0 | 36 | 64.24 | 68.0 |
| 2 | " | " | 1 | 4 | 64.46 | 68.0 |
| 3 | " | 5.0 | 0 | 20 | 63.76 | 68.0 |
| 4 | " | " | 1 | 3 | 65.11 | 68.0 |
| 5 | 1.0 | 3.0 | 0 | 45 | 64.95 | 65.67 |
| 6 | " | " | 1 | 53 | 65.00 | 66.0 |
| 7 | 2.0 | 4.0 | 0 | 45 | 65.27 | 66.67 |
| 8 | " | " | 1 | 27 | 64.92 | 66.33 |
| 9 | 3.3 | 10.0 | 0 | 20 | 63.76 | 68.00 |
| 10 | " | " | 1 | 4 | 65.03 | 68.00 |
| 11 | 2.0 | " | 0 | 45 | 65.27 | 66.67 |
| 12 | " | " | 1 | 11 | 65.00 | 66.67 |
| 13 | 1.0 | " | 0 | 45 | 64.95 | 65.67 |
| 14 | " | " | 1 | 45 | 64.97 | 65.67 |

Runs 3-4 or 9-10 indicate a potential reduction in the # of sheds for a properly adjusted system from 10/hr to 2/hr and an increase in average power of about 1300 kw. This corresponds to an increase in energy of about 30,000 kwh/day or, at about 500 kwh/ton, a production increase of 60 tons/day.

I claim:

1. In a power demand control system associated with a plant having loads supplied with electrical energy from utility power lines including: means for selecting loads selected to be switched from one of an ON and OFF status to the other in accordance with a priority schedule to maximize production while maintaining within a deadband about an assigned demand limit reference signal the energy consumed by the plant; and means for measuring the power consumed from said power lines for a predetermined number N of equal time intervals, each defined between two consecutive said sampling instants; the combination of:

first means responsive to the power measured by said measuring means during (N-1) consecutive said time intervals ending at a present sampling instant for providing a first signal representative of the (N-1) time interval demand of energy consumed during said (N-1) consecutive time intervals;

second means responsive to said measuring means and to said first means for predicting at said present sampling instant the deviation of demand during the time interval subsequent to said present sampling instant and for providing a second signal representative of the amount of power consumed at said sampling instant if maintained constant during said subsequent time interval;

third means for comparing said demand limit reference signal to the sum of said first and second signals as a representation of predicted demand for N time intervals for deriving an error relative to said demand limit; and means for switching a selected load in response to said error exceeding said demand deadband, thereby to maintain the assigned demand limit within the demand deadband, while minimizing load switching manipulation.

2. The control system of claim 1 with fourth means responsive to said measuring means for predicting a power deviation at said present sampling instant and for deriving a third signal representative of said power deviation; with fifth means responsive to said second and third signal and operative on said switching means for causing the same to switch a selected load when said demand deviation and said power deviation are adding to one another and when said power deviation is in excess of a predetermined power deadband.

3. The control system of claim 1 or 2 with said selected loads having a predetermined time lag in responding to said switching means to establish one of said ON and OFF status.

4. The control system of claim 1 or 2 with a maximum power limit being imposed on the operation of said switching means.

5. The control system of claim 2 with said power deadband and said demand deadband being each operative in one of two opposite directions about said assigned demand limit.

6. The control system of claim 5 with said power deadband defining a minimum power deviation which is asymmetrical relative to said assigned demand limit.

7. The control system of claim 5 with said demand deadband defining a minimum demand deviation which is asymmetrical relative to said assigned demand limit.

8. The control system of claim 2 with at least one of said power and demand deadbands being established in relation to the size of the load selected to be switched by said switching means.

* * * * *